United States Patent [19]

Hamalainen

[11] Patent Number: 4,550,351
[45] Date of Patent: Oct. 29, 1985

[54] ADAPTIVE AUTOMATIC SCAN TRACKING SYSTEM

[75] Inventor: Kaarlo J. Hamalainen, Marlton, N.J.

[73] Assignee: RCA Corporation, Princeton, N.J.

[21] Appl. No.: 695,754

[22] Filed: Jan. 29, 1985

Related U.S. Application Data

[63] Continuation of Ser. No. 363,810, Mar. 31, 1982, abandoned.

[51] Int. Cl.$^4$ ............................................. G11B 5/58
[52] U.S. Cl. ..................................... 360/77; 360/10.2; 360/78
[58] Field of Search ................... 360/10.2, 70, 75, 76, 360/77, 78

[56] References Cited

U.S. PATENT DOCUMENTS

| | | | |
|---|---|---|---|
| 4,151,570 | 4/1979 | Ravizza et al. | 360/77 |
| 4,215,362 | 7/1980 | Ravizza | 358/8 |
| 4,420,778 | 12/1983 | Sakamoto | 360/77 |
| 4,443,823 | 4/1984 | Sakamoto | 360/77 |

FOREIGN PATENT DOCUMENTS 0046341  2/1982  European Pat. Off. ............. 360/78

OTHER PUBLICATIONS

IBM Technical Disclosure Bulletin, vol. 5, No. 1, Jun. 1962, p. 33, "Magnetic Head Positioning", Buslik.
"Get Notch Qs in the Hundreds", by Mike Kaufman, published Aug. 2, 1974 in Electronic Design 16, pp. 96–101.

Primary Examiner—George G. Stellar
Attorney, Agent, or Firm—Eugene M. Whitacre; Paul J. Rasmussen; Joseph J. Laks

[57] ABSTRACT

A servo loop for an automatic scan tracking arrangement for a helical-scan videotape playback machine includes a wideband relatively low-gain portion for fast acquisition and correction of mistracking errors. In order to provide high gain for reducing mistracking which recurs from scan to scan, a second path in the servo loop in parallel with the wideband path includes a commutating filter which accumulates the average error signal generated by the wideband system in a commutating filter and reinserts the averaged error to provide adaptive systematic correction having a comb-like response. This reinsertion reduces the magnitude of the systematic errors which the wideband portion of the servo must correct, and therefore reduces the amount of closed-loop mistracking which repeats from scan to scan.

4 Claims, 33 Drawing Figures a.

b.

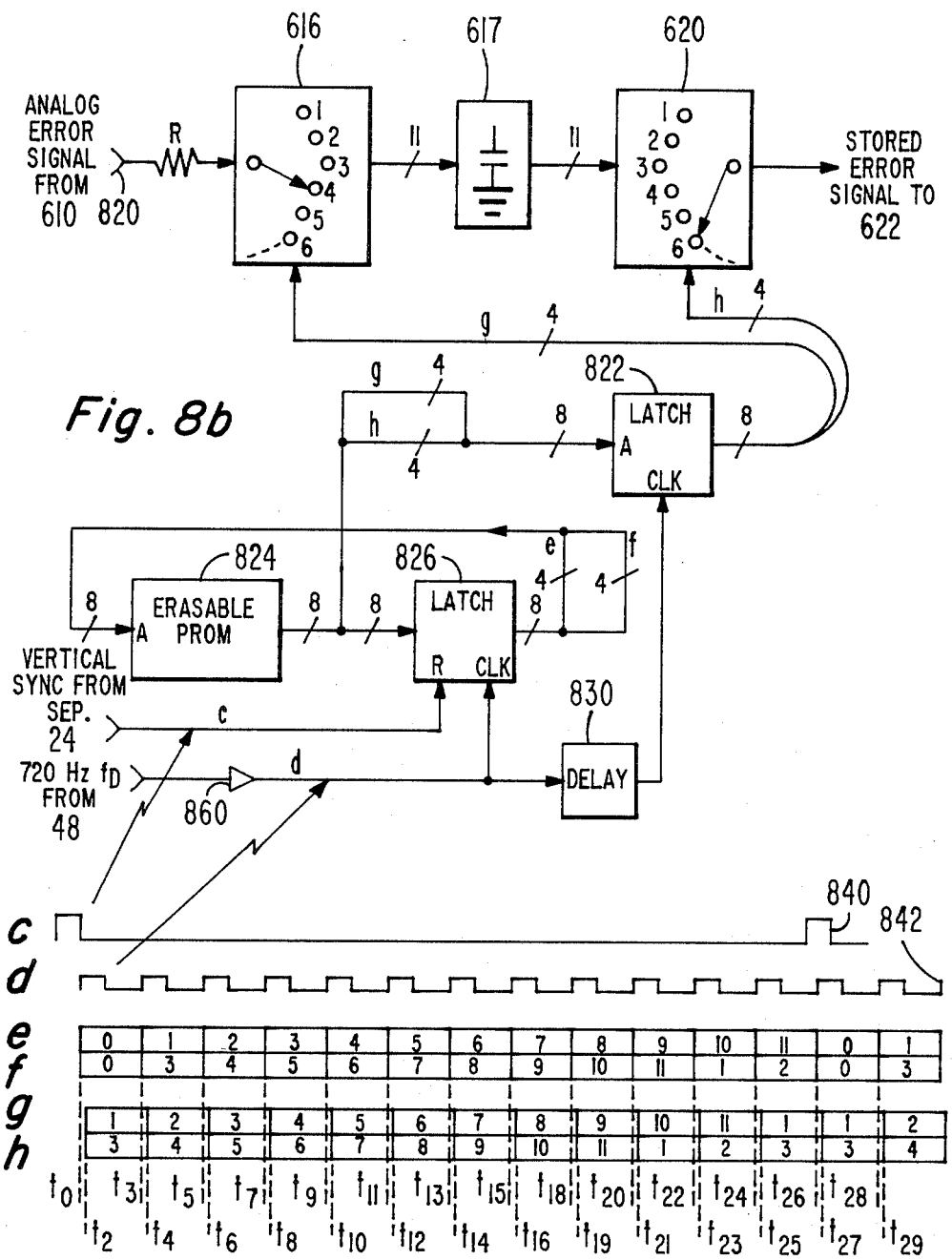

ADAPTIVE AUTOMATIC SCAN TRACKING SYSTEM

This is continuation of application Ser. No. 363,810, filed 3/31/82 now abandoned.

BACKGROUND OF THE INVENTION

This invention relates to an automatic scan tracking system (AST) for a helical-scan VTR (video tape recorder) which reduces mistracking due to closed-loop errors by an adaptive learning of the required correction.

Conventional helical-scan VTRs include a headwheel about which a magnetic tape passes in a helical path. Recording and playback heads associated with the headwheel are rotated at a relatively high speed so as to achieve a high transducer-to-tape velocity for good frequency response. Each scan of a head across the slowly moving tape is almost longitudinal. The recorded tape includes a succession of closely spaced recorded tracks. Ordinarily, each scan of a track by a transducer occurs in a time substantially equal to a television field (262½ horizontal lines). In order to obtain high information density on the tape, the recorded tracks are closely spaced and narrow in width. Reproduction of video signals from such a helically-scanned recorded tape requires that the playback transducer closely follow the recorded track. The width of the playback transducer cannot be made much larger than the width of the recorded track, for otherwise mistracking might result in picking up signals from an adjacent track. Due to the mechanical tolerances from tape to tape and between the various recorders and playback machines, and also due to stretching of the tape due to variations in temperature, tension and the like, mistracking of the recorded track by the playback head may occur, with the result that signals from adjacent tracks may be picked up by the playback transducer and thereby increase the noise level of the desired signal, or in extreme cases the head may completely leave the desired track and respond to an adjacent track.

In the prior-art video tape playback arrangement of FIG. 1, a tape (not shown) is drawn past a playback transducing head 10 attached by a mounting 12 to a piezoelectric bimorph element 14. The bimorph element is adapted for moving the playback head in a direction transverse to the direction of relative motion between the transducer and the tape, which is a direction generally perpendicular to the length of the recorded track. The head, mounting and bimorph are mounted on a headwheel (not shown) for rotation therewith so as to provide a high head-to-tape speed necessary for reproduction of video. A sinusoidal signal is applied from dither generator 48 to bimorph 14 in order to cause the playback head to move back and forth transversely as it sweeps along the recorded track, as illustrated in FIG. 2. This oscillation or dither causes the playback head to mistrack slightly to the right and to the left of the track as viewed along the track, so that the playback head partially overlies the guardbands between tracks. This has the effect of reducing the amplitude of the transduced FM carrier during those intervals in which the head partially overlies the recorded track and partially overlies the guardband. The transduced playback signal includes a carrier which is frequency-modulated with the recorded information and which is also modulated in amplitude by the effect of the dither. As transducer 10 scans a recorded track on the tape, the transduced frequency-modulated (FM) signals are coupled to the input of an FM preamplifier 18 which amplifies the signals and applies them to a playback amplifier and equalizer illustrated as a block 20. The equalized FM signals are applied to an FM demodulator 22 for demodulation of the video signals modulated onto the FM carrier. So long as the dither amplitude is not excessive, the amplitude of the FM carrier will not decrease to an extent which introduces noise into the recorded information. The information can thus be recovered by a conventional FM demodulator including a limiting amplifier for limiting the carrier to strip the amplitude modulation therefrom, together with a conventional frequency demodulator for recovering the information signal. The demodulated video is applied to a sync separator 24 and to a utilizing apparatus (not shown). The equalized FM signal from equalizer 20 is also applied to a sensing arrangement designated generally as 26 which includes an AM envelope detector 28 which detects the variations in the amplitude of the FM signal. The demodulated envelope information is applied to a sample-and-hold circuit 30 which is keyed by a tape horizontal sync pulse extracted from the video information by separator 24. Since the sync tip, as FM modulated, always represents the same FM carrier frequency, sampling of the envelope of the FM carrier during the sync tip guarantees that the amplitude of the envelope is not affected by frequency-dependent amplitude characteristics of the transducer, preamp or equalizer. The sampled signal is applied to a band-reject filter 32 for purposes to be described. The filtered signal is applied to an input terminal of a synchronous detector 34. The strain gauge illustrated as 16 is physically coupled to the bimorph element and is arranged to produce signals representative of the deflection of the bimorph and therefore of the position of transducer 10. The other input to synchronous detector 34 is the signal from strain gauge 16, amplified and limited by an amplifier 36 and zero crossing detector 38. The synchronously detected amplitude modulation of the FM carrier appearing at the output of detector 34 is applied through a second band-reject filter 40 and an amplifier and phase compensator (APC) 42 to an integrator 44. It is found that when the playback transducing head scans a path centered upon the recorded track, with the dither excursions being approximately symmetrical, that the principal component of the detected amplitude modulation is at twice the dither oscillator frequency, whereas if the scan of the playback head is centered along a path removed from the center of the recorded track, the recovered amplitude modulation includes components at the dither oscillator frequency. The phase of the recovered amplitude modulation relative to the dither oscillator signal depends upon whether the mistracking is to the right or to the left of the recorded track, viewed in the direction of the scanning path. Integrator 44 filters the error signal before applying it to an adder 46 for combination with the dither signal of frequency $F_d$. The combined dither and integrated signal is applied through a drive amplifier 50 to bimorph element 14 for deflection thereof by the sum of the error signal and the dither signal. In FIG. 2a, a recorded track 50 is illustrated, together with the sinuous path, illustrated by a number of vertical lines, representing the various positions taken by the gap of the playback head as it is dithered by the combined drive signal applied to bimorph 14. At times between T1 and T2, the bimorph is deflected to one extreme of its travel and line 52 representing the physical position of the transducer gap at that instant completely overlies recorded track 50. Consequently, the playback transducer picks up maximum FM signal, and envelope detector 28 produces a signal such as represented by waveform 54 having a maximum positive value in the interval T1–T2. Signal 54 has a fundamental component at dither frequency $F_d$ so is not affected by $2F_d$ reject filter 32. At a time midway between times T2 and T3, the playback head is in a position illustrated by line 56, which position is half on and half off the recorded track. The portion which is off the recorded track overlies a guardband and receives no signal. Consequently, the signal picked up by transducer 10 is at a minimum as illustrated by the minimum signal level of signal 54 in interval T2–T3. This pattern is repeated in intervals T3–T4 and T4–T5. It will be noted that as illustrated, the playback head scan path is offset to one side of recorded track 50. The limited strain gauge signal 58 is indicative of the direction of deflection of the bimorph element about its nominal position. Signal 60 represents the output signal of synchronous detector 34, which is the product of signals 54 and 58. In interval T1–T2, signal 58 is positive and signal 54 is also positive, and consequently the detected signal 60 in FIG. 2a also takes on a positive value. In interval T2–T3, however, signal 58 takes a negative excursion as does signal 54, and therefore the product is still positive. Thus, the unfiltered error signal takes on an appearance similar to voltage waveform 62 having an average positive value. This signal has a fundamental component at twice $F_d$, which is filtered by $2F_d$ filter 40. The positive value of the error signal 62 is filtered by integrator 44 and coupled to drive bimorph element 14 in a direction selected to urge the playback head scan path towards the center of recorded track 50 in a closed-loop feedback manner.

FIG. 2b illustrates recorded track 50 and a dithering playback head scan path illustrated as in FIG. 2a by vertical lines representing the instantaneous position of the playback head gap. As can be seen, mistracking in the case of FIG. 2b is to the opposite side of recorded track 50. Consequently, the interval T1–T2 in which the deflection of the bimorph drives the position of the transducing head in the direction shown relative to recorded track 50, the amplitude-demodulated FM signal 64 reaches a minimum value, rather than a maximum value as illustrated in the corresponding time interval in FIG. 2a. Signal 64 has only a dither-frequency component which is not affected by filter 32. Thus, it can be seen that the polarity of the amplitude-demodulated component of the transduced signal is opposite to that shown in FIG. 2a for mistracking of the opposite sense and also contains components at twice the dither frequency, so is filtered by filter 40. The product of waveforms 58 and 64 is principally negative-going as illustrated by waveform 66 of FIG. 2b, and the unfiltered error signal applied to integrator 44 takes on a negative value as illustrated by waveform 68. Thus, mistracking as illustrated in FIG. 2b results in an error signal of opposite polarity to that shown in FIG. 2a, and consequently the feedback loop urges the scan path towards the center of recorded track 50. FIG. 2c illustrates the situation which prevails when the scan path of the playback head is centered on recorded track 50. An amplitude-demodulated signal illustrated as signal waveform 70 is a double-rate signal by comparison with demodulated signals 64 or 54. The feedback loop may discriminate against these components, since they do not convey useful information as to mistracking. For this reason, the arrangement of FIG. 1 includes twice-dither frequency reject filters 32 and 40. The product of demodulated signal 70 and strain gauge signal 58 is illustrated as a waveform 72, which has a net value of zero, as suggested by line 74, representing a zero filtered output signal. With the head centered on the track, therefore, no error signal is generated and bimorph 14 remains in a relatively undeflected state.

If the playback machine is intended to play back tape moving only at the speed at which it was recorded, only a closed-loop dither automatic scan tracking (AST) system is necessary. Broadcast-quality tape recorder-playback machines are now provided with certain special effects capability, such as stop-motion and fast-forward playing speeds. The track as recorded on the tape is the product of two velocities; the velocity of the tape and the velocity of the headwheel. The normal tape velocity is aproximately one percent of the total head-to-head tape speed, and during the recording the tape motion during one recording transducer scan is an amount equal to one track width plus one guardband width.

FIG. 3a illustrates in developed view a portion of a tape 10 upon which are recorded tracks 314, 318, 322 and 327 separated by guardbands 316, 320, and 324. The path scanned by the recording head in the absence of tape motion is illustrated as dotted lines 305. The recording head started at the top of the tape by scanning a path 305, and the tape motion in the direction shown caused the scanning of recorded track 316. Thus, the tape motion during one scan at normal tape speed is one track width plus one guardband width. If head scanning path 305 represents the scanning path of a playback head while the tape is in motion at the normal speed, it can be seen that path 305 would overlie track 316, and in principle no correction would be required. As mentioned, it may nevertheless be desirable to use a closed-loop AST arrangement to make sure that the scanning path coincides with the recorded track. For stop-motion special-effects, the playback head must scan the same track repeatedly, and so the tape must be motionless. The playback head begins scanning of a track, but because of the absence of tape motion it would end its scan on an adjacent recorded track, but for the action of the automatic scan tracking system. In the absence of tape motion, the scanning path illustrated as 326 in FIG. 3b begins at the top of the tape on track 318 but in the absence of tape motion ends its scan substantially overlying recorded track 314. In the region designated as 328, the playback head would substantially overlie the guardband 316 and equal portions of track 314 and 318, and noise would result. Under this condition, the closed-loop AST circuit can correct; but the correction required increases progressively during the scan from top to bottom; i.e. no correction is required at the top and therefore the loop error voltage is approximately zero whereas at the bottom of the scan an error voltage corresponding to a deflection of the bimorph of one track width plus one guardband width is required. Thus, the loop must correct for varying amounts of error during each scan of the playback heads across the tape. As is known, closed-loop feedback systems have a finite gain, and the finite gain requires that there be an error in order to produce the desired correction signal. Closed-loop AST systems have a wide bandwidth for fast response, but therefore have relatively limited gain which permits a tracking error when correcting for large deflections. A similar effect occurs at twice tape speed. When fast-forward playback is desired at speeds greater than twice normal, the AST is required to hold the playback head on the recorded track notwithstanding that in the absence of the AST system several recorded tracks would have passed under the playback head. It can readily be seen, therefore, that in extreme fast-forward playback modes, the deflection of the bimorph which supports the playback head may correspond to the distance between several tracks. Such special-effects modes of operation may create problems. For example, the large deflection in fast-forward modes may cause errors in tracking due to the limited loop gain and speed of the AST arrangement. Furthermore, at the end of a scan in which the bimorph is deflected by several track spacings, the head may start a new track with the bimorph already partially deflected, which may result in exceeding the physical deflection limits of the bimorph element.

A known arrangement for ameliorating the effects of special-effect modes of operation on the automatic scan tracking system involves the use of a tape speed detector for generating an analog signal representative of the tape speed and applying it together with the error signal output of the synchronous detector to the integrator of the AST loop. This results in the generation of a ramp signal at the output of the integrator which is summed with the dither signal for application to the bimorph. The ramp is part of an open-loop compensation which reduces the loop gain requirements on the closed-loop AST system because the bimorph is always positioned in approximately the correct place by the ramp.

FIG. 4 illustrates such a prior art arrangement for injecting an open-loop ramp compensation so as to reduce the mistracking for large deflections in cases where the tape playback speed is other than the recording speed. Those portions of FIG. 4 corresponding to elements of FIG. 1 are given the same reference numbers. Additional elements in FIG. 4 include a summing circuit 410 coupled between phase compensator 42 and integrator 44, a tape speed detector 412, an output of which is coupled to an input of summing circuit 410, and a ramp reset system 414 also having an output terminal coupled to an input terminal of summer 410. A crystal oscillator 416 provides a time reference for tape speed detector 412 and ramp reset 414.

Tape speed detector 412 receives tape horizontal sync pulses separated from the demodulated video by sync separator 24. A phase-locked oscillator 420 produces 2H pulses which periodically reset counter 422. Counter 422 is coupled to receive clock pulses from crystal oscillator 416. Tape speed is determined by counting the time between horizontal sync pulses derived from the tape. As mentioned, normal tape speed corresponds to about one percent of the head-to-tape velocity. A slowing down or stopping of the tape, therefore, can make as much as a one percent difference in the rate at which sync pulses are transduced from the tape. Tape speeds in excess of the normal tape speeds likewise affect the rate of the transduced tape sync pulses. The decoded output of counter 422 is therefore representative of tape speed. The decoded output is applied to a digital-to-analog converter 424 for conversion to an analog signal which is filtered by an integrator 426 to form a substantially constant voltage representative of the instantaneous tape speed. An equally acceptable tape-speed signal generator is an integrator coupled to the capstan tachometer, which also produces an analog signal indicative of tape speed. The analog speed voltage, however generated, is applied to an input of summing circuit 410 to be summed with the unfiltered loop error voltage from synchronous detector 34. The tape speed may be expected to remain constant over times as short as one scan of the tape by the head, and therefore the analog tape-speed voltage component of the signal applied to integrator 44 generates a ramp illustrated as 428. Ramp 428 is applied to summing circuit 46 and the dither is added thereto to form a dithered ramp signal illustrated as 430 which is applied to the bimorph element. The ramp component of the bimorph drive signal is an open-loop compensating voltage tending to cause the bimorph to deflect over the interval of one head scan of the tape by an amount corresponding to the expected deviation as determined by the tape speed. The open-loop compensating ramp voltage applied to bimorph 14 causes it to deflect in a ramp-like manner and strain gauge 16 therefore produces as an output signal a dither signal superimposed upon a ramp, as illustrated by 432. Such a superposed ramp might affect operation of zero-crossing detector 38. This effect is avoided by deriving a ramp sample 428 from the output of integrator 44 and applying it to an inverting input terminal of amplifier 36 to offset the ramp component of the input signal applied from the strain gauge to the noninverting input. Thus, only the dither signal appears at the input of zero-crossing detector 38, as before, and the open-loop ramp correction does not affect zero-crossing detector 38.

As mentioned, the tape speed remains approximately constant over the duration of one scan and in fact over the duration of several scans of the tape. Consequently, the analog tape speed signal applied from tape speed detector 412 to summing circuit 410, if continued, would cause the output signal of integrator 44 to grow without limit. The tape speed ramp-correction, therefore creates a condition in which there must be a reset of the ramp signal at the output of the integrator after the completion of each scan by the playback head, for the increasing ramp would cause a corresponding increase in the bimorph deflection. The reset is provided by a controllable reset current generator, the output of which is summed with the analog speed signal at the input to the integrator of the AST loop. Ramp reset circuit 414 includes a controllable signal source 434, the output of which is coupled to a further input of summing circuit 410. The reset current generator 414 is controlled to reset the integrator by an amount established by a jump decision logic circuit which in turn is controlled by the headwheel drum once-around signal, reference 2H signals and the clock signal from oscillator 416 to determine the phase of the actual vertical sync pulse from the tape with the time at which it would be expected to appear if the tape were moving at its normal speed. A logic circuit 436 chooses a preset magnitude of the reset ramp which is required to place the bimorph and its associated playback head on the desired track at the beginning of the next following scan. Signal generator 434 is enabled by the logic circuit and produces a signal the magnitude of which is established by the logic circuit. This large signal is applied to summer 410 for a short period of time, which resets integrator 44 as illustrated by portion 438 of ramp 428. The open-loop correction ramp therefore provides an open-loop correction which positions the bimorph and its associated playback head in the approximate location which is required to follow a recorded track for the particular tape speed at which playback occurs. The reset current generator moves the bimorph to position the transducer at the appropriate track at the beginning of the next scan.

The described system operates satisfactorily, but it has been found that the open-loop ramp correction only approximates the correction actually required. Furthermore, the required correction deviates from a linear ramp along the scanning path of the transducer, from position to position along the tape and as a function of the particular tape and playback machine being used. Residual mistracking may therefore occur. The residual mistracking prevents reduction of the width of the guardband, and so causes tape consumption to exceed the minimum possible. The residual mistracking may become large enough to cause the introduction of noise. It is desirable to reduce residual scan mistracking.

SUMMARY OF THE INVENTION

An improved playback system comprises a headwheel and a playback transducer associated with the headwheel and arranged for rotation coaxial therewith. A tape transport is coupled to the headwheel and adapted for passing a recorded tape around the headwheel along a path such that the rotating playback transducer recurrently scans a generally longitudinal path across the tape at an angle substantially equal to the angle of the recorded tracks. A closed-loop automatic scan tracking arrangement includes a controllable mount for the playback transducer and also includes a sensing circuit for sensing mistracking of the transducer relative to the recorded track and for generating an error signal for application to the controllable mount for urging the transducer towards the center of the recorded track. The improvement includes a memory coupled to the closed-loop automatic scan tracking arrangement for storing from scan to scan information relating to the mistracking. A corrector is coupled to the automatic scan tracking arrangement and to the memory for supplementing the error signal with the information from the memory.

DESCRIPTION OF THE DRAWING

FIGS. 8b–h include details of the AST system memory and diagrams aiding in understanding the operation;

DESCRIPTION OF THE INVENTION

Figure 5:
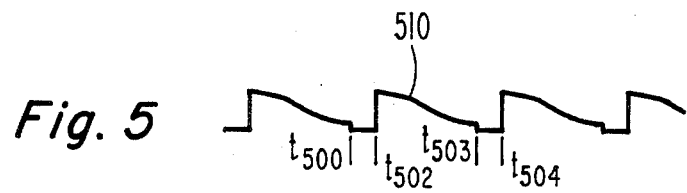
FIG. 5 illustrates an amplitude-time plot of a particular error signal with a systematic component.

FIG. 5 illustrates as a waveform 502 a representative drive voltage required to maintain a playback transducer on a recorded gap. Waveform 510 is curved in the interval T502–T503, which is the active portion of the scan. Interval T500–T502 represents the time during which the transducer head is crossing the gap in the tape. It can be seen that at time T504, for example, which represents the beginning of a track, that the magnitude of the error voltage required to start the head on the track is different from the magnitude of the error voltage required at the end of the previous track, such as at time T503. Thus, a certain amount of mistracking can occur at the beginning of the track before the wideband loop can acquire the track and slew to the correct position. In accordance with the invention, such mistracking is avoided by memorizing or storing the error signal as a function of position along the track and using this information to supplement the error signal, with or without additional open-loop compensation. This allows the servo loop to have high gain at multiples of the headwheel once-around frequency, for improved reduction of systematic errors occurring at frequencies which are multiples of the headwheel rotational frequency.

Figure 1:
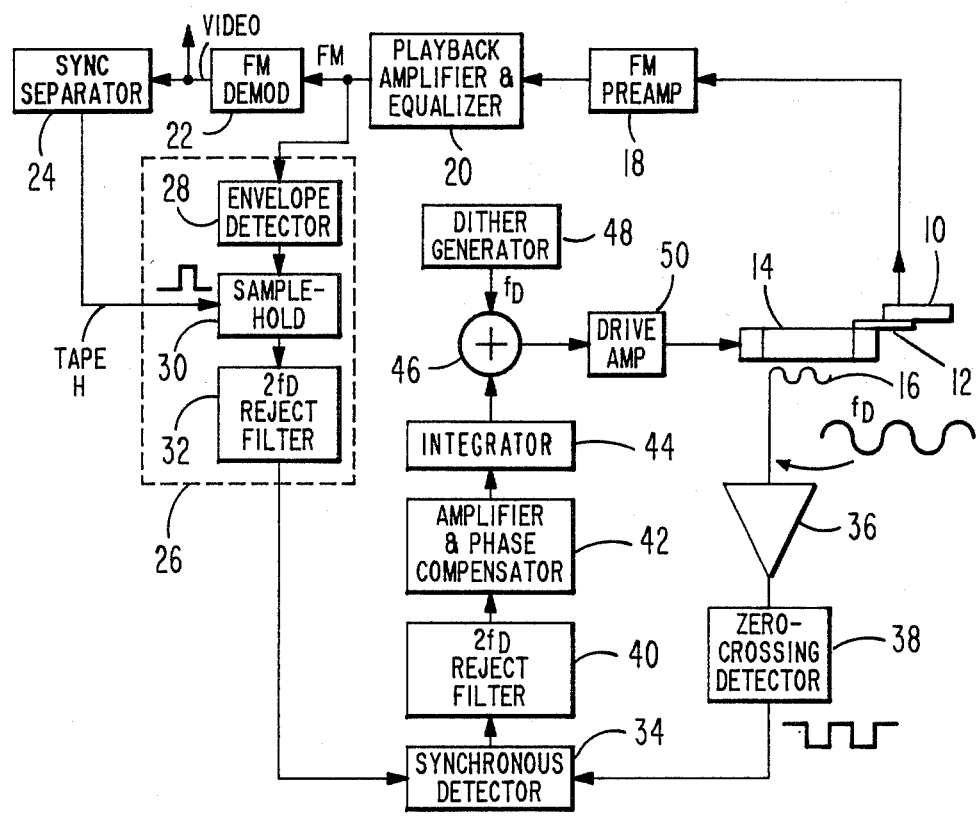
FIG. 1 is a block diagram of a portion of a video tape playback machine including a prior art automatic scan tracking arrangement.
Figure 7:
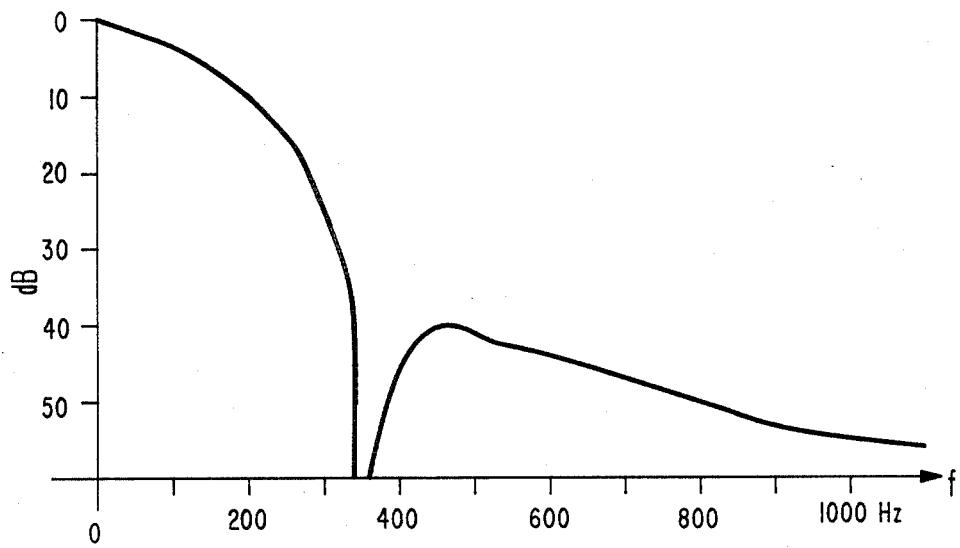
FIG. 7 is a plot of the frequency response of an antialias filter of the arrangement of FIG. 6.
Figures 2A, 2B, 2C:
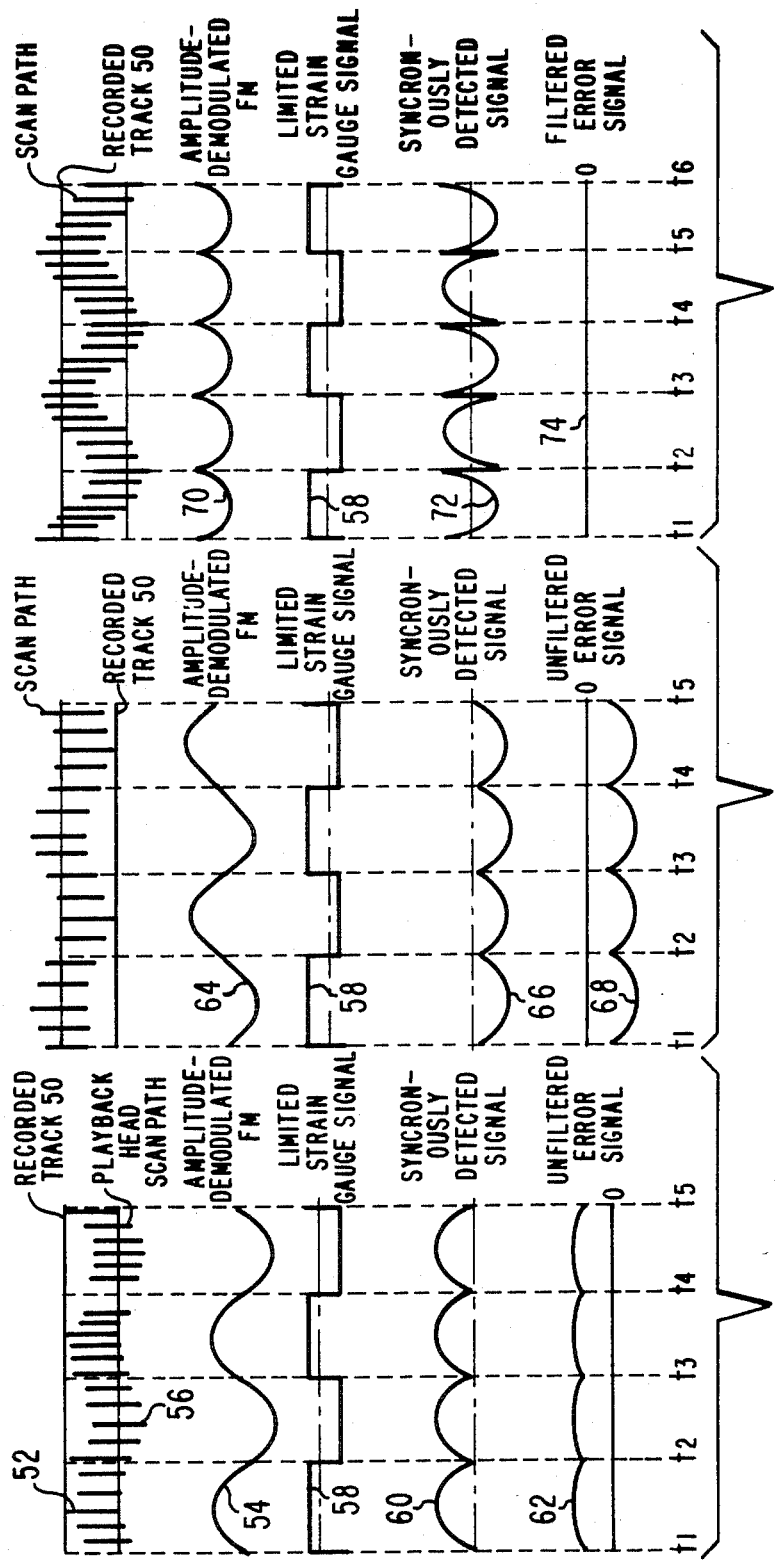
FIGS. 2a, 2b, and 2c illustrate various signal voltages occurring in the arrangement of FIG. 1 under different tracking conditions.
Figure 3:
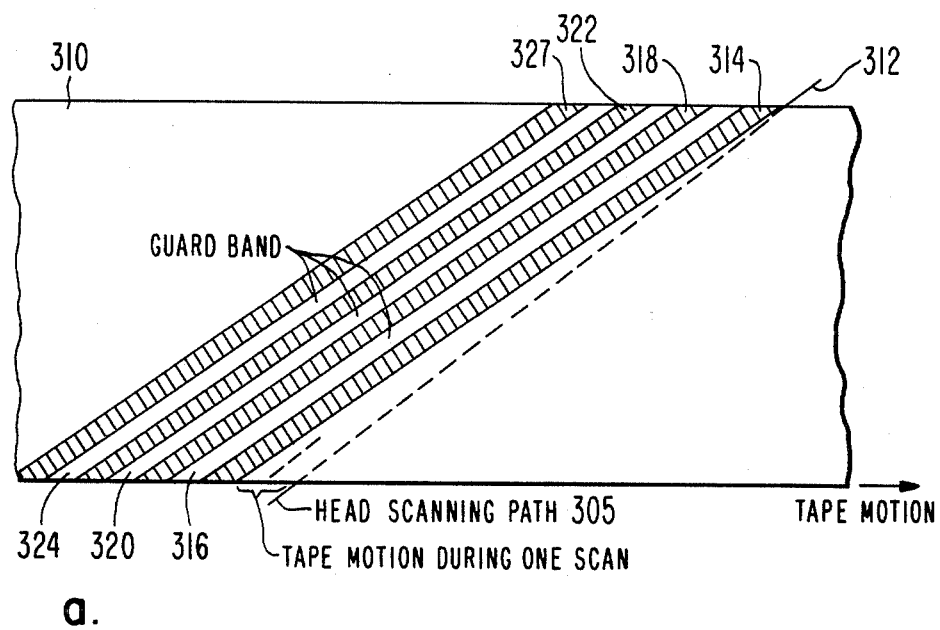
FIG. 3, a and b, illustrate the effect of tape motion on the position of the recorded tracks relative to the scanning head.
Figure 3:
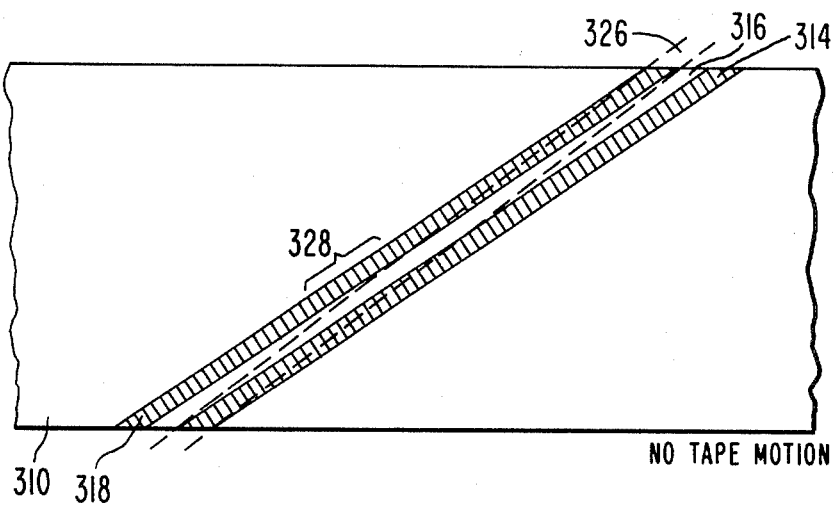
Figure 4:
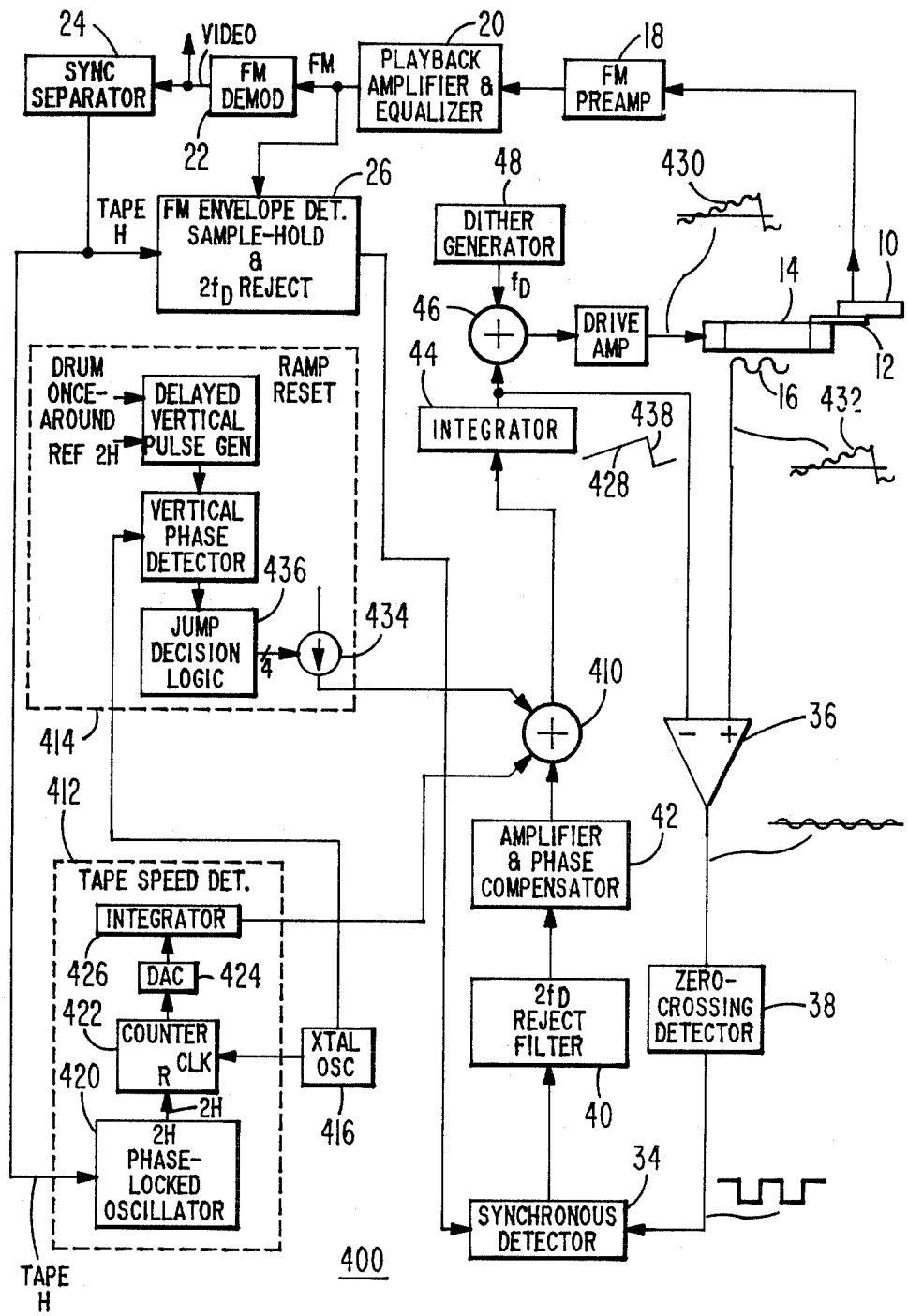
FIG. 4 is a block diagram of a prior art video tape playback arrangement adapted for playing back tapes at various tape speeds.
Figure 6:
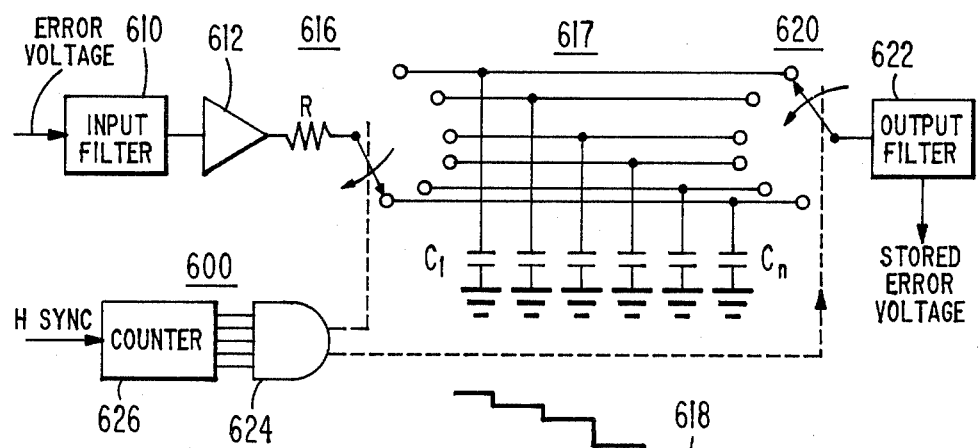
FIG. 6 illustrates in simplified form one embodiment of a memory suitable for storing error signals according to the invention.
Figure 8A:
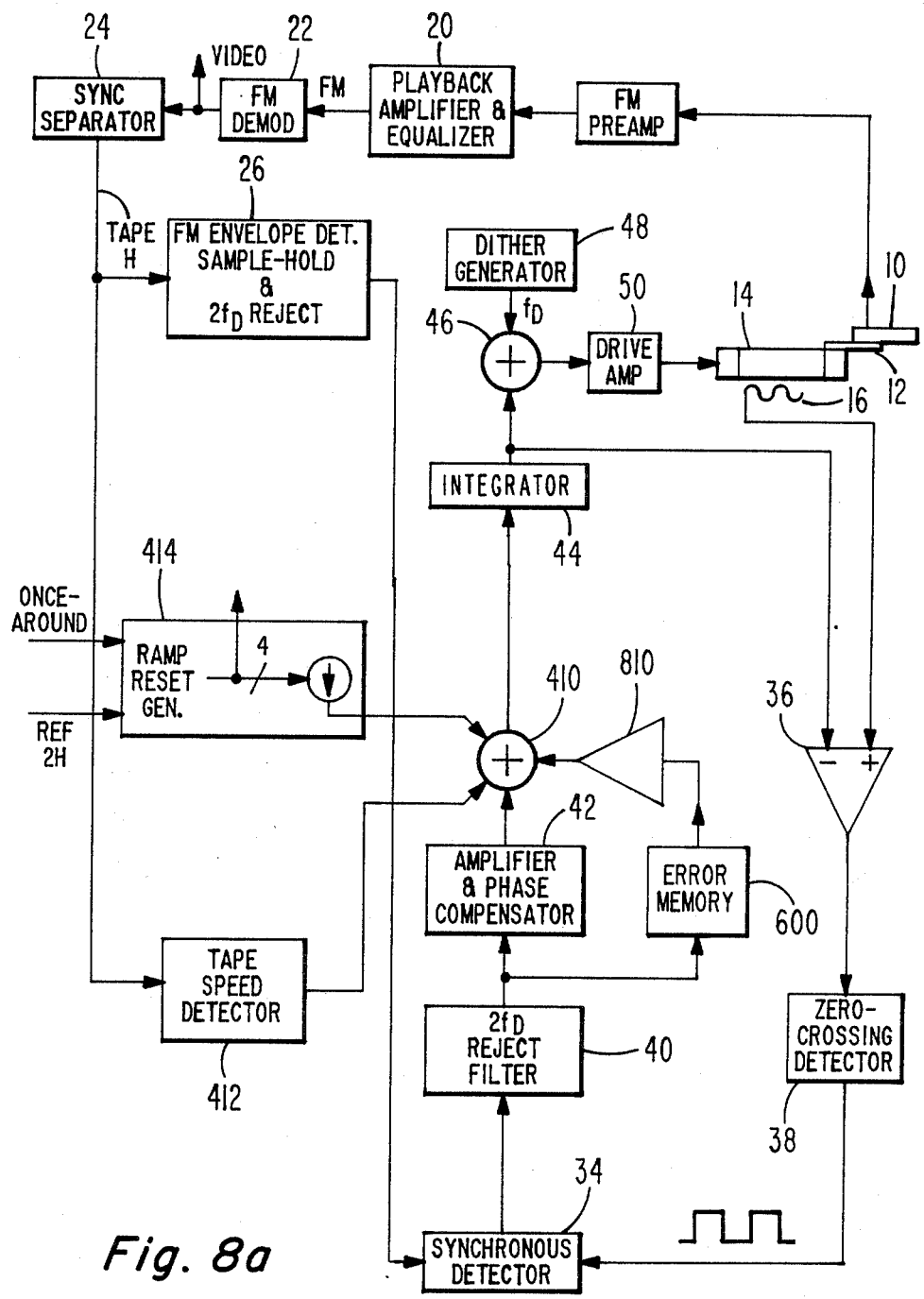
FIG. 8a is a block diagram of an AST system according to the invention including the memory of FIG. 6.

FIG. 6 illustrates the general configuration of an analog memory 600 suitable for storing an error voltage in accordance with an aspect of the invention. In FIG. 6, the error voltage detected by synchronous detector 34 of FIGS. 1 or 4 is applied to an anti-alias input filter 610 for eliminating switching transients and aliasing due to the following sampling function and the filtered error voltage is applied by way of an amplifier 612 to a resistor R which is switched by a multiplexing switch 616 in turn to a plurality of capacitors $C_1$–$C_n$ designated together as 617, not all of which are shown in FIG. 6. For a type-C helical-scan recorder, an NTSC embodiment uses 11 capacitors for a scan which is completed in 1/60 second, while 13 capacitors are used for a PAL version in which the scan is 1/50 second. Multiplex switch 616 is controlled by a switch drive (illustrated in detail in FIG. 8b) to cycle at the same rate as the scan recurrence rate of the playback head, which is normally the rotational speed of the headwheel. While switches are illustrated as being mechanical, those skilled in the art will realize that semiconductor switches are used in practice. For each position taken by multiplex switch 616, one of capacitors C is coupled through resistor R to the output of synchronous detector 34, and this occurs at approximately the same point in each recurrent scan. After a period of time of operation corresponding to several headwheel rotations, each of the capacitors will charge to a voltage representative of the average value of the error voltage required at the particular position along the playback head scan at which the capacitor is in-circuit. If the voltages on capacitors C of FIG. 6 could be made visible after a period of operation with an error signal such as is shown in FIG. 5, they might have the appearance of stepped waveform 618. Output multiplex switch 620 is operated in synchronism with switch 616 for selecting the appropriate stored error voltage for the particular position of the playback head along its scan and for applying the voltage to an output filter 622 having characteristics similar to those of filter 610, and illustrated in FIG. 7. This characteristic is low-pass with a null at 360 Hz, which is half the sample rate of switches 616 and 620. The filtered stored error voltage is applied from output filter 622 as a further input signal to adder 410 as illustrated in FIG. 8. In FIG. 8a, an amplifier 810 is arranged to amplify the additional input signal to adder 410 to signify the increased loop gain possible due to the comb-like response of memory or filter 600. The spectral response of filter 600 of FIG. 6 is illustrated as 910 in FIG. 9a. The spectral response 910 includes peaks centered at multiples of the headwheel rotational or scanning rate of 60 HZ for an NTSC VTR, and the bandwidth of each of the response peaks is related to the values of R and C. Because of the narrow bandwidth of the closed-circuit feedback loop including filter 600, the gain about the path may be made greater than the gain of the wideband path.

Figure 9:
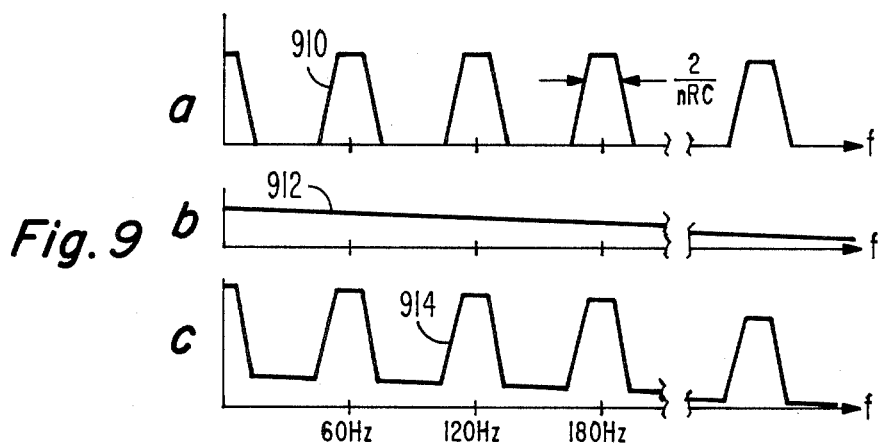
FIG. 9, a–c, illustrate a spectrum plot of the relative response of the memory of FIG. 6.

FIG. 9b illustrates as 912 the spectral response of the closed-loop portions of the prior-art wideband AST system, and FIG. 9c illustrates as 914 the result of combining the wideband low-gain and comb-like high-gain responses. The gain of the feedback loop is made very high at those frequencies which are related to the rotational velocity of the headwheel.

As illustrated in FIG. 8, the memorized or stored signal is inserted at summing point 410. Consequently, the correction signal is integrated by integrator 44 before being applied to bimorph 14. The memorized error signal can therefore be viewed as being the first derivative of the position, i.e. the error signal represents the rate-of-change of position, which is velocity.

There are delays in the feedback loop. Filters, especially, contribute to the delays. Thus, the errors written into memory 600 are delayed relative to the time at which they are produced by the wideband correction loop. For this reason, the reading of memory 600 does not occur exactly one scan duration (1/60 second for NTSC standards) after the information is written into the memory, but instead is read at a time somewhat advanced from 1 scan duration later. Thus, instead of reading the memory 16.7 milliseconds (msec) after writing in, the reading may occur about 15 msec after writing. This causes the stored correction to be summed with the wideband correction with the proper phase. Naturally, the exact amount of advance will depend on the nature of the loop. Switching of the multiplex switches of filter 600 may be accomplished either by dither pulses or, as illustrated in FIG. 6, by a counter 620 which is reset during each tape vertical sync interval and which counts tape horizontal sync pulses. A decoder 622 decodes outputs from the counter at particular preselected counts. For example, if n is 11, a decoded output of the counter might occur at multiples of 23 horizontal lines; i.e. at 23, 46, 69 . . . horizontal lines. The decoded signals are used to throw multiplex switches 616 and 620 to their next state, so that switching of capacitors C of the memory portion 617 of filter 600 occurs at approximately equal intervals during the head scan. For a dither frequency $f_D$ of 720 Hz, approximately 11 dither cycles occur during one 1/60 second scan. Consequently, the dither signal need not be counted-down in order to provide switching among 11 capacitors.

FIGS. 8b–h illustrate in block-diagram form and with timing diagrams the nature of the addressing scheme for error memory 600. In FIG. 8b, input terminal 820 receives analog error signal from anti-alias filter 610 and applies it through a resistor R to multiplex switch 616 having terminals numbered 1-n where n can be a number such as 11, equal to the number of capacitors in capacitor bank 617. Similarly, multiplex switch 620 has a number of contacts also equal to the number of capacitors which in the example is 11. Multiplex switch 620 selects a capacitor and couples the stored error signal of that capacitor to anti-alias filter 622 and to the remainder of the AST servo loop. The 11 positions of multiplex switch 616 can be addressed by 11 of the 16 possible code combinations available on 4-bit line g, and the 11 switch positions of multiplex switch 620 can likewise be selected by 11 of the 16 codes possible with 4-bit line h. Each of lines g and h is half of the 8-bit output of a latch 822 which is addressed by a dither-frequency clock on a line d derived from dither generator 48 by a limiting amplifier 860. The dither clock is illustrated as 842 in FIG. 8d. Latch 822 merely acts as a power driver for the output of erasable PROM (EPROM) 824, the output terminals of which do not have sufficient drive capacity to drive multiplex switches 616 and 620. The 8-bit output of EPROM 824 is also applied to the input terminals of a latch 826 which is also clocked by dither clock 842. Vertical sync from separator 24 is coupled to a reset (R) input terminal of latch 26 over a conductor c. The 8-bit output of latch 826 is coupled to the address (A) input of EPROM 824. The 8-bit output line of latch 826 is split into two 4-bit portions designated as e and f to aid in understanding the operation of the addressing.

In operation, the separated vertical sync pulses 840 as illustrated in FIG. 8c are applied over conductor c to the R input of latch 826. At a time $T_0$ as illustrated in FIGS. 8c–h, a positive-going transition of the dither-frequency clock pulse 842 on conductor d is applied to the clock input of latch 826 and to an input of a delay circuit 830. The positive-going transition of clock signal 842 applied to the clock input terminal of latch 826 while the signal applied over conductor c to the R input is HIGH causes latch 826 to produce on its two 4-bit output conductors e, f digital signals corresponding to decimal values 0, 0, as illustrated in time $T_0$–$T_3$ in FIGS. 8e and 8f. When combined, the two 4-bit output signals of latch 826 on conductors e, f act as an 8-bit address signal which is applied to the address (A) input of EPROM 824. For input address decimal 0,0 EPROM 824 is programmed to produce on its 8-bit output conductor 828 two 4-bit digital values corresponding to decimal values 1,3 as illustrated in intervals T2-T4 in FIGS. 8g and 8h, respectively. The positive-going portion of clock signal 842 is delayed by delay circuit 830 by an amount corresponding to time interval $T_0$–$T_2$ before being applied to the clock input of latch 822. This avoids a race condition, and allows the two 4-bit digital signals corresponding to decimal 1,3 to be latched for driving multiplex switches 616 and 620. Thus, in the first moments $T_2$–$T_4$ after the beginning of the new scan, conductor g has a decimal value 1 which causes multiplex switch 616 to select the first capacitor of capacitor bank 617 into which the error signal at the beginning of scan can be written. In the absence of delays, capacitor 1 would also be selected for reading. Due to the delays, mainly attributable to the integrators and filters in the loop, the error signal being applied to capacitor 1 corresponds to the value of error signal required to drive the bimorph at a time near the end of the previous scan. During this same time $T_2$–$T_4$ the digital value corresponding to decimal 3 applied over conductor h to multiplex switch 620 selects for reading a capacitor time-advanced relative to capacitor 1, as for example capacitor 3; the decimal numbers illustrated in FIGS. 8g and 8h which are representative of the two programmed 4-bit digital numbers can therefore be seen to represent the numerical designation of the storage capacitor into which error signal is currently being written and from which stored error signal is currently being read, respectively. In the interval $T_2$–$T_4$ capacitor 1 is being written into and capacitor 3, which is time-advanced from capacitor 1, is being read from and the signal therefrom is applied as an error correction signal. At time $T_3$, a positive-going transition of clock signal 842 causes the 1, 3 signal applied to the input terminals of latch 826 to be transferred to its output and latched as values 1, 3 on conductors e, f as illustrated in FIGS. 8e–8f. The two 4-bit digital signals on conductors e, f corresponding to decimals 1, 3 are a new 8-bit address which is applied to input A of EPROM 824, which responds by producing on its output conductor 828 preprogrammed 4-bit digital numbers having decimal values 2, 4, which are applied to the input of latch 822 for latching at a time $T_4$ at which the positive-going clock transition appears at the clock input of latch 822 due to the effect of delay circuit 830. Decimal values 2, 4 on conductors g, h select capacitors 2 for writing and 4 for reading in the time interval T4–T6.

The above process continues, with latch 826 latching the output signal of PROM 824 for use as the new address of the PROM, while latch 822 holds the preprogrammed output signal of the PROM for one clock period and applies the signal during that clock interval at an address for multiplexing switches 616 and 620. This cycle causes a stepping through the memory of EPROM 824 in a particular preprogrammed pattern and the application of the contents of the memory to the multiplexing switches for selection of the capacitor currently to be written into and to be read from. The phase advance of the READ switch relative to the WRITE switch as indicated by the decimal values illustrated in FIGS. 8g–8h compensates for phase delays around the automatic scan--tracking loop, including the delays of the anti-alias filters associated with memory 600. For example, in the interval $T_{19}$–$T_{21}$, EPROM 824 produces on conductor g a binary equivalent to decimal 9 for selecting capacitor 9 to be written into. Due to the delays in loop, the error signal being written into capacitor 9 is the error signal which was required in the interval $T_{14}$–$T_{15}$ so capacitor 9 is read during the interval $T_{14}$–$T_{15}$ as illustrated in FIG. 8h. Similarly, capacitor 8 is read during a time $T_{11}$–$T_{14}$ advanced from the time $T_{16}$–$T_{19}$ during which capacitor 8 is written into. It must be remembered that the capacitors of capacitor bank 617 do not merely store the value of the error signal from the previous scan, but instead act in conjunction with resistor R as integrators to average over a larger number of scans. Thus, the systematic portion of the error signal is integrated onto capacitors 617 and each capacitor is read sufficiently in advance of the writing time to compensate for loop phase errors.

Figure 10:
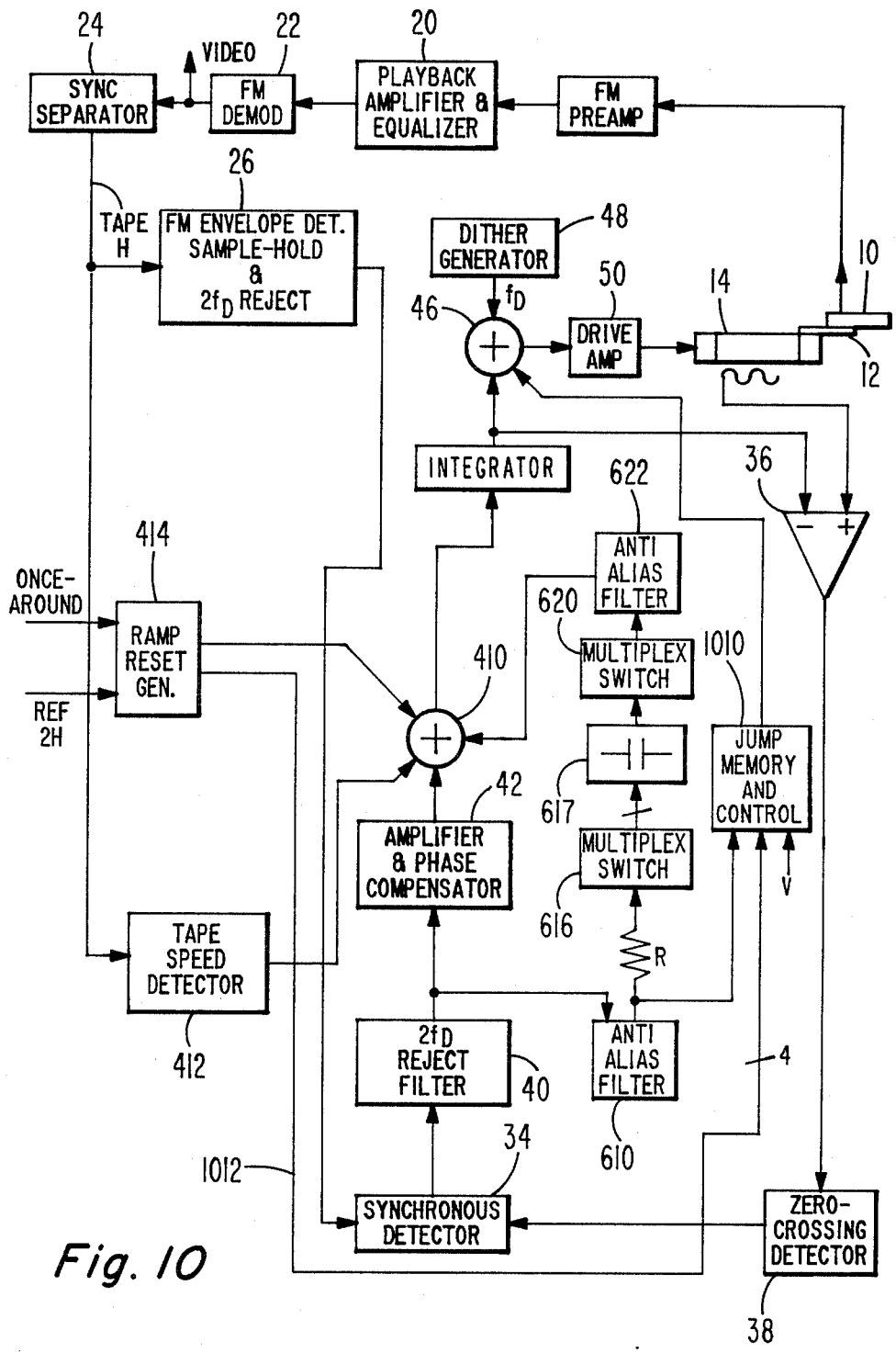
FIG. 10 is a block diagram of the arrangement of FIG. 8 including a jump memory according to a further aspect of the invention.
Figure 11:
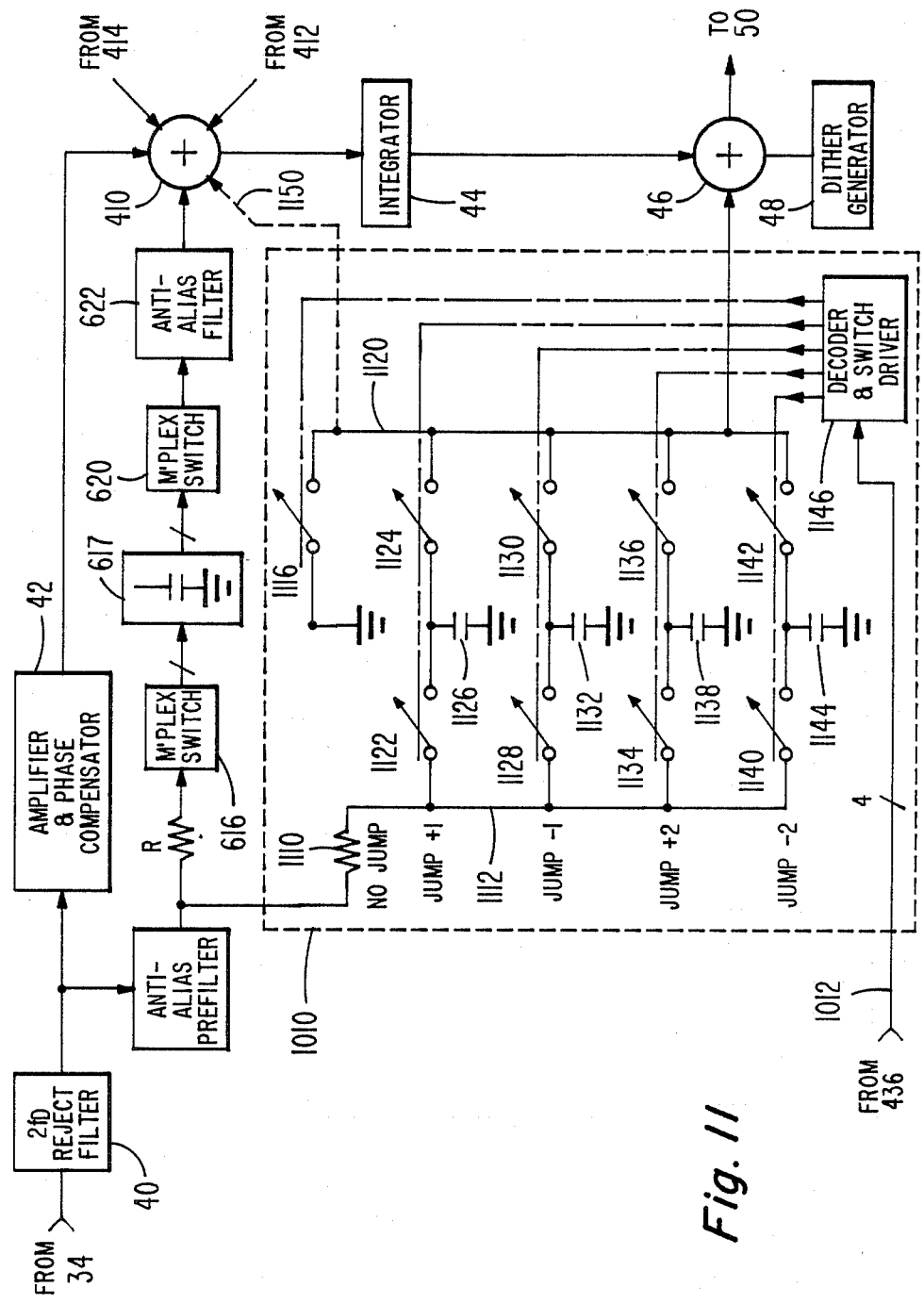
FIG. 11 is a diagram in block and schematic form of a jump memory suitable for use in the arrangement of FIG. 10.

The storage or memory arrangement may be used to aid in acquisition of the correct track at the beginning of a scan of the head across the tape, as well as for increasing the loop gain. FIG. 10 illustrates as a block 1010 an additional set of storage capacitors and switching circuits illustrated in greater detail in FIG. 11 which can store the value of the particular bimorph drive voltage required to reset the bimorph by the number of tracks required by ramp reset generator 414. The decision logic of ramp reset generator 414 is led out on parallel 4-bit conductors 1012 and applied to block 1010, which also receives a vertical reference signal for synchronization. Block 1010 chooses one of m capacitors for storage of the jump data. Each capacitor is used for storage of the jump error voltage for resetting of the bimorph for a particular number of tracks. FIG. 11 illustrates details of jump memory and control 1010. In playback operation at normal tape speeds in the forward directions, no jump is necessary to maintain the head on-track. A switch 1116 is switched in-circuit to apply ground or zero voltage to the input of summing circuit 46. This mode of operation is selected by decoder and switch driver 1146 when the binary level of all 4 conductors of line 1012 is LOW. For forward operation at twice normal tape speed, a jump of +1 track is required. This mode of operation occurs when a particular one of the lines of conductor 1012 is HIGH, causing decoder-driver 1146 to close ganged switches 1122 and 1124, thereby coupling capacitor 1126 for charging towards the jump error voltage through resistor 1110 and for coupling the voltage stored on capacitor 1126 to an input of summer 46. Similarly, a HIGH on another of conductors 1012 selects a stop-action mode, which requires that the head jump back by one track for each scan. This mode is selected by decoder 1146 by activating switches 1128 and 1130 to couple capacitor 1132 to resistor 1110 and summer 46. A HIGH on a third conductor of line 1012 selects capacitor 1138 by switches 1134 and 1136 to charge to the error voltage required to jump forward by two tracks at the end of the scan, as required for 3× forward speed. A HIGH on the fourth conductor 1012 is decoded and selects capacitor 1144 to charge to the voltage required for a jump back by two tracks, as required for reverse-motion display at normal speed. While the jump memory output signal is illustrated as being applied to summer 46, the signal could be applied instead to summer 410, as illustrated by dotted connection 1150.

Figure 12A:
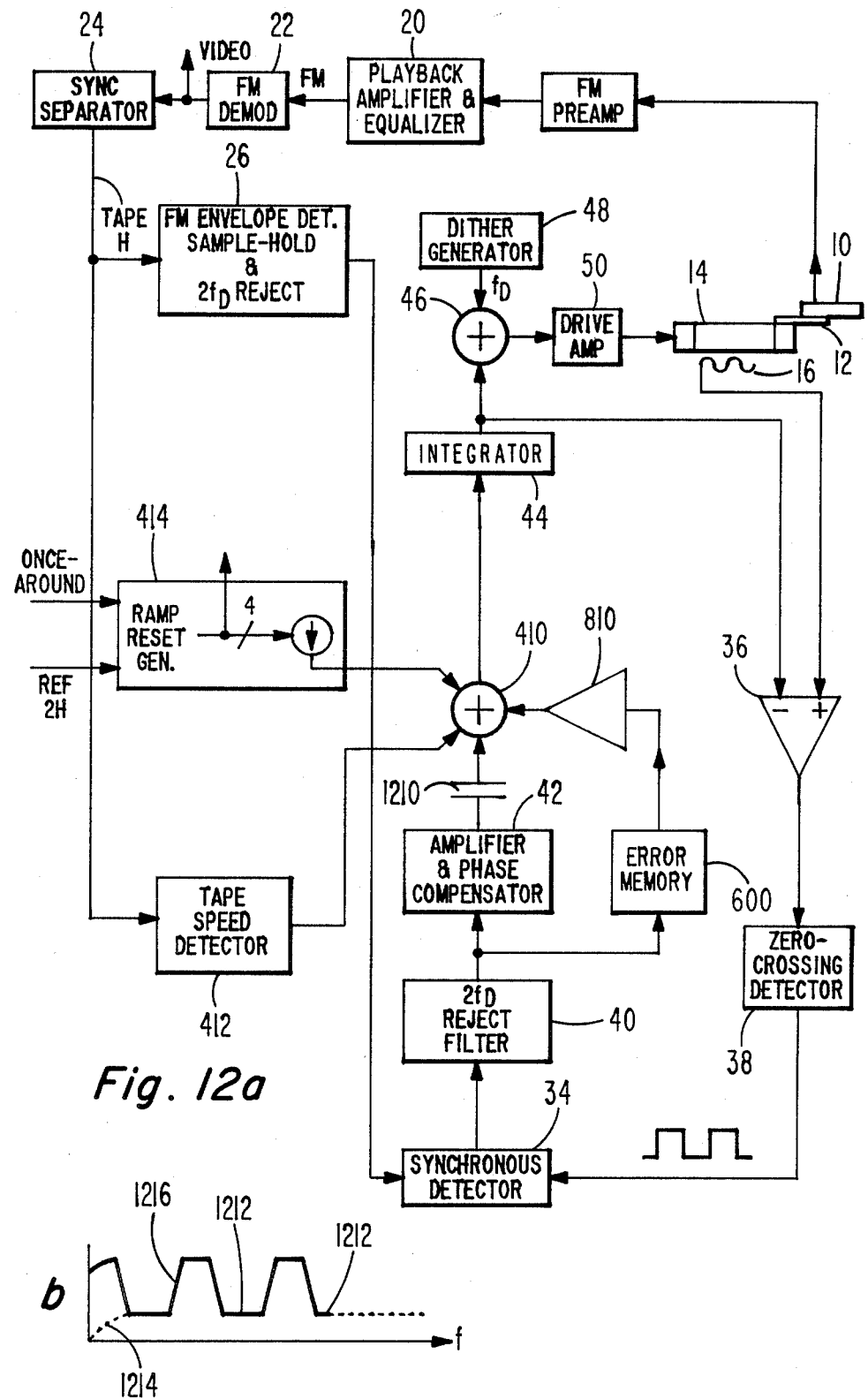
FIG. 12, consisting of a and b, is an AST arrangement similar to FIG. 8 including an ac-coupled wideband feedback portion.

Since the low-frequency loop gain of the automatic scan tracking system including memory 600 is ordinarily attributable principally to the high-gain memory portion, some circuit simplification may be possible by AC-coupling the wideband path through amplifier and phase compensator 42, as illustrated in FIG. 12 in which a symbolic capacitor 1210 is included in the wideband path through amplifier and phase comparator 42. Naturally, this capacitor may be located within block 42 anywhere AC-coupling rather than direct-coupling would effect a circuit simplification. This gives a loop frequency response as illustrated in FIG. 12b, wherein the response of the wideband portion of the loop is represented at higher frequencies by base portions 1212 of the overall response and at lower frequencies by dotted portion 1214. The portions of the response contributed by the error memory are the recurrent peaks 1216 superimposed on the baseline. As can be seen, the low-frequency rolloff of the wideband response affects the low-frequency overall loop gain very little.

Figure 13:
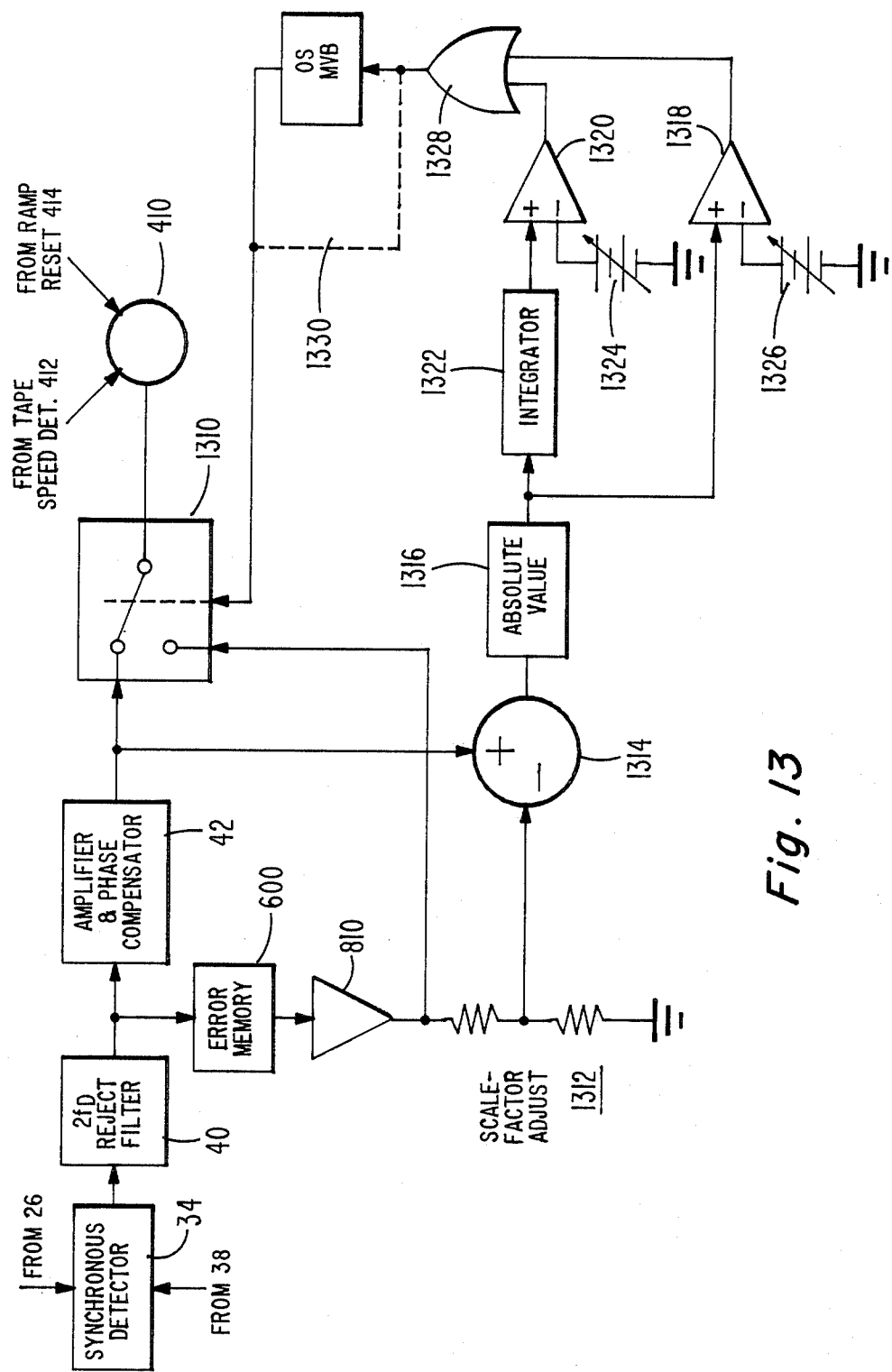
FIG. 13 is a block diagram of an AST arrangement in which modes of operation are automatically selected.

Another embodiment of the invention uses a comparator to compare the wideband error signal with the learned or stored error signal, and switches select one or the other, depending upon the magnitude of the difference therebetween. FIG. 13 illustrates in block-diagram form a portion of an automatic scan tracking loop including synchronous detector 34, reject filter 40, amplifier and phase compensator 42, memory 600 and summer 410. Also included are a controllable selector switch 1310 adapted for selecting either the wideband error signal from amplifier and phase compensator 42 or the stored error signal from 600 amplified by amplifier 800. A scale-factor adjustment circuit illustrated as a voltage divider 1312 is coupled to the output of amplifier 810 and an output from the tap of the divider is applied to one input of a differencing circuit 1314. The output signal of amplifier and phase compensator 42 is applied to a second input terminal of differencing circuit 1314. The difference signal is applied through an absolute-value circuit 1316 directly to the noninverting input terminal of a comparator 1318 and to the noninverting input terminal of a comparator 1320 by way of an integrator 1322. Comparator 1320 compares the long-term average magnitude of the difference between the wide-band and stored error signals with a relatively small threshold voltage reference illustrated as a battery 1324. If the long-term difference between the two error signals exceeds the threshold, comparator 1320 produces a HIGH output signal. Comparator 1318 compares the magnitude of the instantaneous difference between the wideband and stored error signals with a larger reference voltage from a source illustrated as a battery 1326. Comparator 1318 produces a HIGH output signal for such instantaneous or short-term errors. The comparator output signals are coupled to the inputs of an OR gate 1328 which produces a HIGH output signal if either the short-term or long-term differences exceed their respective preset levels.

The output of OR gate 1328 may be applied directly to the control input terminal of switch 1310 as suggested by dotted-line 1330 or it may be coupled to the trigger input terminal of a one-shot multivibrator 1330 for generating a signal of a particular duration for causing switch 1310 to select the wideband error signal for application to summer 410. When switch 1310 selects the stored error signal for application to summer 410, the loop tends to reject noise and to track in a more consistent manner than in the wideband mode. However, in the event of a splice in the tape or some change in the tracking, the adaptive error memorizing portion of the loop may not respond quickly enough, and large errors may result. In this event, the difference is sensed and switch 1310 is thrown to the wideband position, remaining there for either a preset period of time before reverting to the memory-loop state if the one-shot is used, or remaining in the wideband mode until the learned error causes the differences between the wideband error and the learned error to drop below the threshold amounts, with direct connection 1330.

Figure 14A:
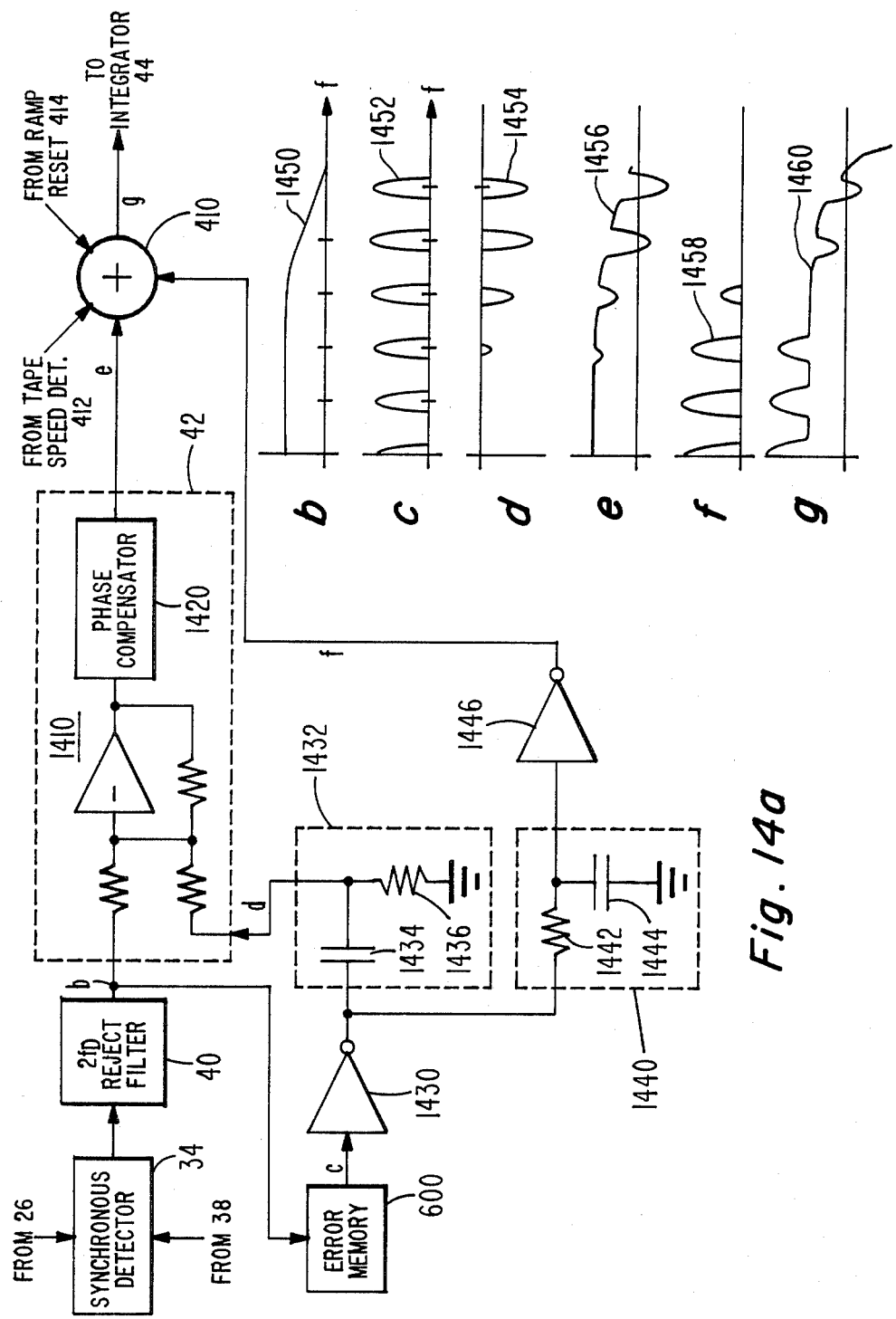
FIG. 14, consisting of 14a and b through g, includes a block diagram of an AST arrangement having high gain at low synchronous frequencies and low gain at high synchronous frequencies, together with frequency-response diagrams aiding in understanding the invention.

A highpass-lowpass filter pair can be used as in FIG. 14 for enhancing the gain of the servo loop at low frequencies which are multiples of the headwheel synchronous frequency for improved error correction while reducing the gain at high synchronous frequencies in order to reduce the possibility of oscillation due to peculiarities of the tape transport. The wideband response 1450 of the loop on conductor b of FIG. 14a is illustrated in FIG. 14b. This wideband signal is applied to error memory 600 and is combed, producing a relatively in-phase combed response as illustrated by response curve 1452 with peaks centered on those frequencies synchronous with the headwheel rotation. Combed characteristic 1452 is phase-inverted by an inverter 1430 and high-pass filtered by a filter 1432 illustrated as a simple RC filter to produce on a conductor d a response illustrated as 1454 in FIG. 14d. The responses 1450 and 1454 are summed in a summer amplifier portion 1410 of amplifier and phase compensator 42 to produce a notched broadband response on conductor e depicted as 1456 of FIG. 14e. The comb response 1452 on conductor c is relatively inverted by inverter 30, is low-pass filtered by a filter 1440 illustrated as an RC filter and again inverted by an inverter 1446 to produce on a conductor f a response 1458 as illustrated in FIG. 14f. The responses of the loop as they appear on conductors e and f are summed in summing circuit 410 to produce on output conductor g a net loop response depicted in FIG. 14g as 1460. Such a closed-loop response enhances gain at low synchronous frequencies for reduction of errors recurring at the headwheel rotational rate while reducing the possibility of instability due to phase changes occurring at high synchronous frequencies.

Other embodiments of the invention will be apparent to those skilled in the art. For example, the closed-loop automatic scan tracking system may be a multiple-track system as described in IBM Technical Disclosure Bulletin Volume 5 No. 1, June 1962 page 33, rather than a dither system, or any of a number of other types of AST. Other storage elements, such as CCD delay lines, may be used as memories for storing the error signal. Ancillary circuits such as excessive-deflection protectors may be included within the scope of the invention. Piezoelectric bending indicators may be used rather than strain gauges. The tape speed detector, if used, may be any of the known conventional speed detectors, including a tachometer coupled to a tape drive capstan. Similarly, the jump-decision circuitry may be embodied in many forms including the form of a logic circuit responsive to the switch by which the tape speed is selected. The size of the various capacitors C of the analog filter of FIG. 6 may differ one from the other, if desired, in order to tailor the loop gain. Digital RAMs (Random-access memories) may be used instead of storage capacitors for storing either the error or jump signal, or both.

What is claimed is:

1. A playback system comprising:
a headwheel;
playback transducing means associated with said headwheel and arranged for rotation coaxial therewith;
tape transport means adapted for passing a recorded tape around said headwheel along a path such that said playback transducing means recurrently scans a generally longitudinal path along said tape at an angle substantially equal to the angle of a recorded track, said playback transducing means scanning a path across said tape which may deviate from said recorded track, thereby causing mistracking;

a closed-loop automatic scan tracking means for varying the scanning path of said playback transducing means across said tape relative to the center of said recorded track, sensing means for sensing mistracking of said transducing means and means for generating an error signal for application to said closed-loop automatic scan tracking arrangement for moving the scanning path of said transducing means towards the center of a recorded track, said closed-loop automatic scan tracking means having relatively limited gain which permits residual tracking error along the length of said track;

a plurality of memory means coupled to said closed-loop automatic scan tracking means for storing from scan to scan portions of said error signal from a like plurality of selected positions along said length of said track to form stored error signals; and summing means coupled to said closed-loop automatic scan tracking means and to said plurality of memory means for adding said stored error signals to said error signal for supplementing said error signal with said stored error signal associated with said selected position for reducing said residual mistracking along the length of said track.

2. The playback system of claim 1 wherein said closed loop automatic scan tracking means includes a controllable mounting for said playback transducing means to which said error signal is applied.

3. A playback system comprising:

a headwheel;

playback transducing means associated with said headwheel and arranged for rotation coaxial therewith;

tape transport means adapted for passing a recorded tape around said headwheel along a path such that said palyback transducing means recurrently scans a generally longitudinal path along said tape at an angle substantially equal to the angle of a recorded track, said playback transducing means scanning a path across said tape which may deviate from a recorded track, thereby causing mistracking;

a closed-loop automatic scan tracking arrangement for varying the scanning path of said playback transducing means across said tape relative to the center of said recorded track, sensing means for sensing mistracking of said transducing means and means for generating an error signal for application to said closed-loop automatic scan tracking arrangement for moving the scanning path of said transducing means towards the center of a recorded track, said closed-loop automatic scan tracking arrangement requiring aid in acquiring the correct track at the beginning of a scan of said transducing means across said tape, said closed-loop automatic scan tracking arrangement also having residual tracking error along the length of each of said tracks which is attributable to systematic errors;

first memory means coupled to said closed-loop automatic scan tracking arrangement for storing from scan to scan a first portion of said error signal representing information relating to mistracking in the vicinity of said beginning of each scan of said transducing means across said tape, and for adding said stored first portion of said error signal to said error signal for supplementing said error signal with said stored first portion for accurately positioning said playback transducing means at said start of each of said recorded tracks thereby aiding in acquiring the correct track at said beginning of each scan; and second memory means coupled to said closed-loop automatic scan tracking arrangment for storing from scan to scan a second portion of said error signal representing information relating to said mistracking in a region apart from said vicinity of said beginning of scan of said transducing means and for adding said stored second portion of said error signal to said error signal for supplementing said error signal with said stored second portion for accurately positioning said playback transducing means along said track in said region apart from said vicinity of said beginning of scan of said transducing means for reducing that portion of said residual tracking error along the length of each track which is atributable to systematic errors.

4. The playback system of claim 3 wherein said closed loop automatic scan tracking arrangement includes a controllable mounting for said playback transducing means to which said error signal is applied.

* * * * *